US012346408B1

(12) United States Patent
Greenberg et al.

(10) Patent No.: US 12,346,408 B1
(45) Date of Patent: Jul. 1, 2025

(54) MINIMAL ENTROPY RESOURCE ALLOCATOR (71) Applicant: Raytheon Company, Arlington, VA (US)

(72) Inventors: Adam Hodge Greenberg, Gardena, CA (US); Adam Trapp, Inglewood, CA (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/402,210

(22) Filed: Jan. 2, 2024

(51) Int. Cl.
*G06F 16/00* (2019.01)
*G06F 9/50* (2006.01)
*G06F 18/241* (2023.01)

(52) U.S. Cl.
CPC .......... *G06F 18/241* (2023.01); *G06F 9/5005* (2013.01)

(58) Field of Classification Search
CPC ........ G06N 3/045; G06N 3/084; G06N 20/00; G06N 10/00; G05B 13/0285; G05B 13/0265; G06F 7/588; G06F 7/58; G06F 13/38; G06F 16/35; G06F 17/16; G06F 16/1824; G06F 16/1834; G06F 2209/509; G06F 9/5016; G06F 9/5038; G06F 9/5066; G06F 16/285; G06F 18/285; G06F 2203/012; G06F 2203/04806; G06F 2203/04808; G06F 3/011; G06F 3/013; G06F 3/017; G06F 3/0304; G06F 3/04845; G06F 3/04847; G06F 3/04883; G06F 9/50; H04N 21/252; H04N 21/25883;

(Continued)

(56) References Cited

U.S. PATENT DOCUMENTS 5,562,596 A * 10/1996 Pincus ..................... A61B 5/35
700/71
6,801,878 B1 10/2004 Hintz et al.
(Continued)

OTHER PUBLICATIONS

Krishnapuram, Raghu, et al., "Classification of Text Documents Based on Minimum System Entropy", Proceedings of the Twentieth International Conference on Machine Learning (ICML-2003) Washington DC, (2003), 384-391.

(Continued)

*Primary Examiner* — Shyue Jiunn Hwa
(74) *Attorney, Agent, or Firm* — Schwegman Lundberg & Woessner, P.A.

(57) ABSTRACT

Systems, devices, methods, and computer-readable media for sensor allocation and object classification. A method can include determining, by a sensor allocator, a first dwell assignment, the first dwell assignment associating a sensor of sensors with a respective object of objects to be classified, providing, by the sensor allocator, the first dwell assignment to one or more devices capable of orienting the sensors to measure corresponding assigned objects, receiving, from a classifier, that classified the objects based on measurements from the sensors in implementing the first dwell assignment, a classification for each of the objects, determining, by the sensor allocator and based on the classification, a second dwell assignment associating each sensor of the sensors with a different object of the objects than that assigned in the first dwell assignment, and providing, by the sensor allocator, the second dwell assignment to the one or more devices.

18 Claims, 5 Drawing Sheets (58) Field of Classification Search
CPC ....... H04N 21/44218; H04N 21/44226; G06Q 30/0201; G06V 10/82; B60G 17/0182; B60G 2600/1879; A61B 5/024; F02D 2041/142
See application file for complete search history.

(56) References Cited

U.S. PATENT DOCUMENTS

| | | | | |
|---|---|---|---|---|
| 7,478,071 | B2 * | 1/2009 | Kadambe | ............... G06F 18/21 |
| | | | | 705/500 |
| 9,295,072 | B2 | 3/2016 | Mintz et al. | |
| 2008/0255911 | A1 * | 10/2008 | Khosla | ............... G06Q 10/0639 |
| | | | | 705/7.38 |

OTHER PUBLICATIONS

Wallace, C.S., et al., "An Information Measure for Classification", The Computer Journal, vol. 11, Issue 2, (Aug. 1968), 185-194.
"International Application Serial No. PCT US2024 062417, International Search Report mailed Apr. 24, 2025", 4 pgs.
"International Application Serial No. PCT US2024 062417, Written Opinion mailed Apr. 24, 2025", 6 pgs.
Shi, Chenguang, "Joint Target Assignment and Resource Optimization Framework for Multitarget Tracking in Phased Array Radar Network", IEEE Systems Journal, IEEE, US, vol. 15, No. 3, (Oct. 6, 2020), 12 pgs.

* cited by examiner

FIG. 5

MINIMAL ENTROPY RESOURCE ALLOCATOR

TECHNICAL FIELD

Embodiments regard allocating sensors to measure features of objects of interest based on minimal entropy, for the purposes of identifying those objects.

BACKGROUND

Classifying multiple unknown targets often includes choosing where to point a limited number of sensors within the field-of-regard. Resource management (RM) has been studied and developed for many system tasks. Sensors are example resources. A rigorous description of RM for classification purposes has not yet been developed. A non-optimal observation strategy wastes resources, takes longer to reach desired thresholds, and degrades overall performance.

DETAILED DESCRIPTION

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

Embodiments calculates an optimal observation strategy, $s^{opt}$, for an arbitrary classification scenario. Embodiments determine $s^{opt}$ using concepts from (i) Bayesian probability and (ii) information theory.

An output of a sensor allocator of embodiments includes data indicating which target, of a plurality of targets, each sensor is to observe in a next iteration of observation. Such data can easily be represented in matrix form as in Table 1:

TABLE 1

Sensor allocation in a notional example. In this example there are 5 targets and 4 sensors (four features).

|  | Sensor 1 | Sensor 2 | Sensor 3 | Sensor 4 |
| --- | --- | --- | --- | --- |
| Target 1 | 0 | 0 | 0 | 1 |
| Target 2 | 0 | 0 | 0 | 0 |
| Target 3 | 1 | 0 | 0 | 0 |
| Target 4 | 0 | 1 | 0 | 0 |
| Target 5 | 0 | 0 | 1 | 0 |

In operation, classifying objects in a given space with sensors that are either observing the objects or can be oriented to observe the objects occurs as follows: (i) select an object for sensor(s) observation, (ii) receive sensor(s) output for the observation, (iii) feed the sensor(s) output to a classifier. Selecting which object a sensor observes is a non-trivial problem. Consider the scenario posed in Table 1 in which there are five targets (sometimes called "objects") to classify and four sensors to measure features for classification. Each sensor measures a different feature of an assigned target to determine a feature of the target. Assume that, at a given iteration of observation, each sensor can only observe (sometimes called "measure") one target of the targets. Then, after each iteration, a classifier receives an aggregation of the features measured thus far. In a first iteration, only four features will be observed. The features can each be associated with one, two, three, or four targets. After one iteration, in this scenario, it is guaranteed that at least one target has no measured features. How does one optimally select which targets to measure and with which sensor or sensors?Prior to the embodiments discussed herein, there is no currently known way of solving this problem optimally. There are many naïve techniques for selecting which object to observe. One such technique is to just point the sensors at the object with a highest priority until it is sufficiently classified, then point the sensors at the object with the next highest priority, and so on. Another technique is to just point the sensors at the object to which they are closest. These techniques are not optimal. There is no consideration for the amount of information gained for a given observation, thus these techniques will result in more dwells for a final classification. Embodiments, in contrast, consider the amount of information gained, in terms of minimizing expected entropy, and thus provide a more optimal solution. Embodiments thus provide a same classification with fewer dwells as compared to prior techniques. Embodiments thus operate to classify a set of targets faster and with less resource bandwidth then prior techniques.

Figure 1:
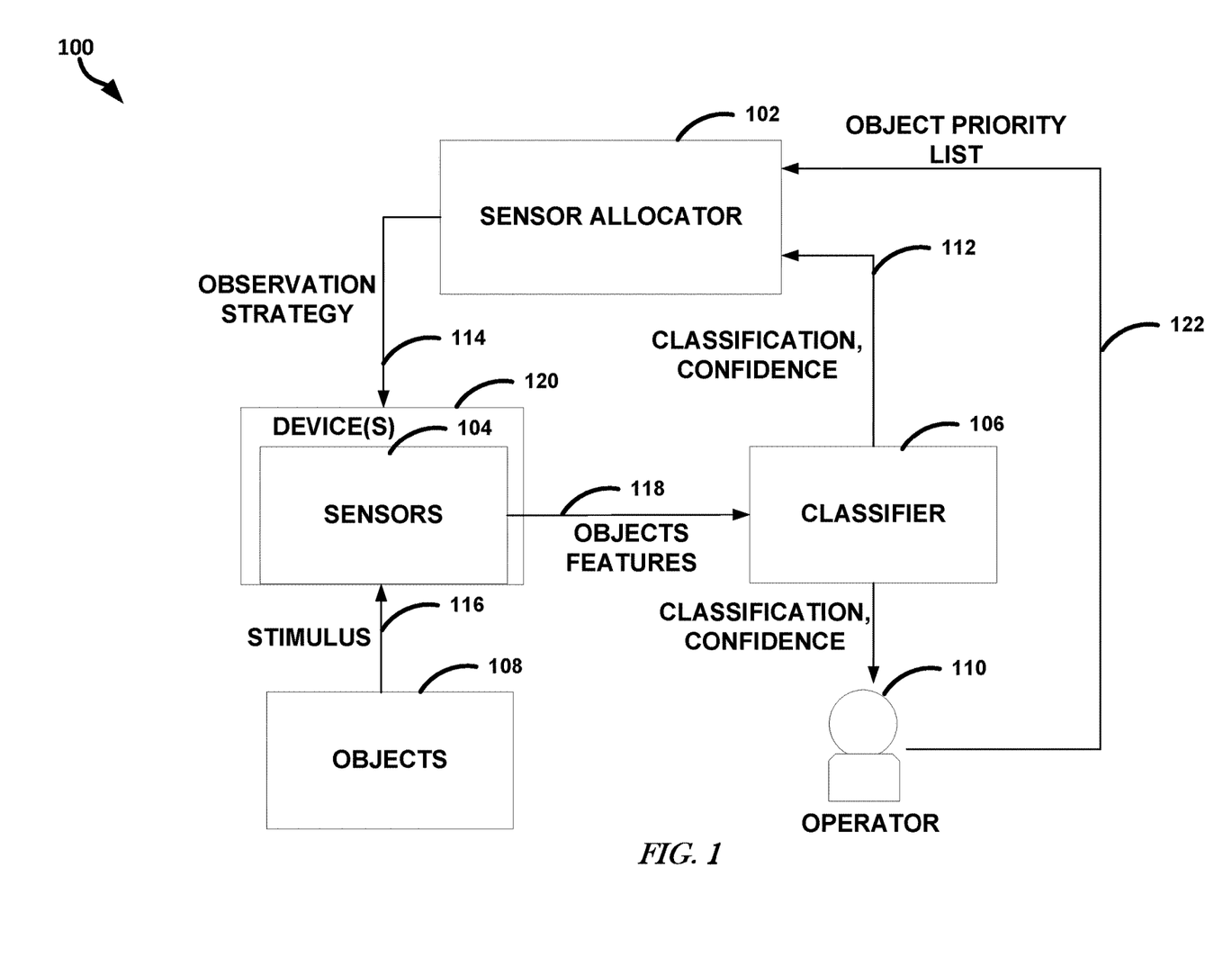
FIG. 1 illustrates, by way of example, a diagram of an embodiment of a system for object classification by optimal sensor allocation.

FIG. 1 illustrates, by way of example, a diagram of an embodiment of a system 100 for object classification by optimal sensor allocation. The system 100 as illustrated includes a sensor allocator 102, sensors 104 that can be oriented by devices 120, objects 108 to be measured by the sensors 104, a classifier 106, and an operator interface 110. The sensor allocator 102 is communicatively coupled to a classifier 106, an operator interface 110, and sensors 104. The sensors 104 are communicatively coupled to the sensor allocator 102, objects 108, and the classifier 106. The classifier 106 is communicatively coupled to the operator interface 110, the sensors 104, and the sensor allocator 102.

The sensor allocator 102 determines, based on a current classification, confidence vector 112 (sometimes called "posterior list") and an optional priority list 122, which sensors 104 will observe which objects 108 in a next dwell. The determination of which sensor of the sensors 104 observes which object of the objects 108 is determined based on minimizing expected categorical posterior entropy across all targets. Categorical posterior entropy is the entropy in the list of categorical posterior probabilities for a single target. A posterior list with zero entropy is in a state of perfect knowledge. A posterior list with maximum entropy is in a state of highest uncertainty. An optimal object observation strategy, $$s^{opt} = \min_{s \in \mathcal{S}}(\Lambda_{\mathcal{A}}(s)),$$

minimizes total expected categorical posterior entropy $\Lambda_{\mathcal{A}}(s)$ over the set of considered strategies $\mathcal{S}$.. More details on how the sensor allocator 102 determines the expected categorical posterior entropy and the corresponding sensor and object assignments is provided elsewhere.

The sensors 104 perform observations or measurements of the objects. The sensors 104 can determine respective features 118 of the objects 108 based on a stimulus 116 received from the objects 108. The stimulus 116 can be chemical, electromagnetic, mechanical, or the like. The features 118 can include a temperature, a distance (e.g., length, width, height, or the like), location, color, electromagnetic radiation, heat, precipitation, or the like, among many others. The sensors 104 can be mounted on devices 120 (one or more sensors per device) in such a way that the devices 120 can alter an orientation of the sensors 104. The devices 120 can orient the sensors 104 based on a dwell assignment indicated by the sensor allocator 102. The devices 120 can orient the sensors 104 to make corresponding measurements of objects to which they are assigned in the dwell assignment. The sensors 104 can be sensing systems that include post processors. The sensing mechanism of the sensors 104 converts some stimulus into a digital signal. That digital signal can then be used as input to a post processor, such as a classifier, a digital signal processor (DSP), or other processing circuitry, that indicates a measurement of a feature based on the input. The measurement can be, for example, a binary number that can indicate whether the feature exists or not or a continuous or discrete number that represents a magnitude or value of the measurement.

The objects 108 are any item that can be classified by the classifier 106 based on features 118 detected by the sensors 104. Example objects include buildings, trees, roads, people, faces, vehicles (e.g., cars, trucks, boats, tanks, aerial vehicles, or the like), projectiles, communications equipment, or the like, among many others.

The classifier 106 determines, based on object features 118 provided by the sensors 104, a class and confidence 112 associated with each of the objects 108. The classifier 106 can operate using a machine learning (ML) model, a heuristic, or the like, to determine which class each object is most likely associated with. The confidence 112, of the classification, indicates how probable the object is actually associated with the classification. There are many types of classifiers and techniques for classification. The classifier 106 can be any classifier capable of classifying between multiple object types based on the same feature set.

The operator interface 110 provides functionality for an operator (a subject matter expert (SME) or personnel with an understanding of the situation being monitored by the sensors 104) to specify an object priority list 122 for the objects 108. The object priority list 122 can be the same across consecutive observations or can change between consecutive observations. The object priority list 122 specifies a priority in which the objects 108 are classified. Using the priority list 122 can constrain the sensor allocator 102 in determining the observation strategy 114.

As mentioned earlier, a goal of the sensor allocator 102 in determining the observation strategy 114 involves minimizing total expected categorical posterior entropy. This minimization includes the calculation of several information theoretic quantities. These information theoretic quantities are now described.

Mutual information I(X; Y) between two random variables X, Y corresponds to the amount of information that can be learned about x (or y) given a measurement of y (or x). The mutual information for discrete random variables is defined as $$I(X;Y) \equiv \sum_{x,y \in \mathcal{X},\mathcal{Y}} P_{X,Y}(x,y) \log \left( \frac{P_{X,Y}(x,y)}{P_X(x)P_Y(y)} \right)$$

where $P_X(x) \equiv \sum_{y \in \mathcal{Y}} P_{X,Y}(x,y)$ and $P_Y(y) \equiv \sum_{x \in \mathcal{X}} P_{X,Y}(x,y)$, and $\mathcal{X}, \mathcal{Y}$ are the supports of X, Y, respectively. I(X;Y) can be thought of as an indicator of how dependent X and Y are on one another—the ratio $$\frac{P_{X,Y}(x,y)}{P_X(x)P_Y(y)}$$

is just a measure of how dissimilar the joint distribution is from the product of the marginals. While the above definition is given for discrete random variables, an equivalent expression can be constructed for continuous random variables as well.

The entropy, H(X), of random variable X is the average of the information, $\log(1/P_X(x))$, that can be gained from measurements of that variable.

The entropy is defined as $$H(X) \equiv -\sum_{x \in \mathcal{X}} P_X(x) \log(P_X(x))$$

Note that because $P_{X,X}(x,x) = P_X(x) P_{X|X}(x|x) = P_X(x)$ (for discrete random variable X), one can write:

$$I(X;X) = \sum_{x \in \mathcal{X}} P_{XX}(x,x) \log \left( \frac{P_{X,X}(x,x)}{P_X(x)P_X(x)} \right) = \sum_{x \in \mathcal{X}} P_X(x) \log \left( \frac{1}{P_X(x)} \right) = H(X)$$

That is, the mutual information between a discrete random variable and itself is equal to the entropy of that variable.

While in general, mutual information is well-defined for both discrete and continuous distributions, entropy is not. This is at least because real-valued probability density functions may have units, and therefore cannot occur within the log function that is used by entropy.

The conditional entropy H(X|Y) of a mixed distribution $\tilde{P}_{X,Y}(x,y)$, wherein X is discrete, but Y is continuous, tells one the expected amount of entropy remaining on X after a measurement of Y $$H(X|Y) \equiv \sum_{x \in \mathcal{X}} \int \int_{y \in \mathcal{Y}} \tilde{P}_{X,Y}(x,y) \log \left( \frac{p_Y(y)}{\tilde{P}_{X,Y}(x,y)} \right) dy$$

A note on notation: $p(\tilde{x})$ is used to indicate a probability density function, $P(\tilde{x})$ is used to indicate a probability mass function, and $\tilde{P}(x)$ is used to indicate a mixed probability distribution that includes both the probability density function and the probability mass function.

As noted earlier, entropy cannot be calculated for real-valued probability distributions. However, conditional entropy can be calculated for real-valued probability distributions, if the real-valued components are those that are conditioned out.

A definition for a new type of mixed distribution—the classification distribution—is provided. The classification distribution is defined as an object that encodes an entire classification problem into a single probabilistic object (at one moment in time). We will describe this object, and how the above information theory quantities are applied to it by the sensor allocator 102.

The classification distribution, $\tilde{P}_{T,\bar{F}}(t,\bar{f}) = \tilde{P}_{T,F_1,\ldots,FN}(t, f_1, \ldots, f_N)$, is an N+1 dimensional mixed probability distribution spanning one dimension, T, of (discrete) categorization and N dimensions, $\bar{F}$, of (potentially real-valued) measured features Within $\tilde{P}_{T,\bar{F}}(t, \bar{f})$, a slice across a particular category $t_i$, $p_{\bar{F}|T}(\bar{f}|t_i) = \tilde{P}_{T,\bar{F}}(t_i,\bar{f})/P_T(t_i)$, yields the feature distribution (i.e., the likelihood distribution) for category $t_i$. Note that not only is the classification distribution mixed, in the sense that one axis, T, is discrete while the other axes, $\bar{F}$, are continuous—but furthermore, the categorical axis T is not even ordinal. This does not prevent application of a rigorous analysis to this distribution's information content.

In general, the classification distribution is constructed from a higher-dimensional object referred to as the pre-marginalized classification distribution. This distribution, written $\bar{P}_{T,\bar{F},\bar{F}'}(t, \bar{f}', \bar{f})$, is a 2N+1 dimensional distribution, $$\bar{P}_{T,\bar{F},\bar{F}'}(t,\bar{f}',\bar{f}) = \bar{P}_{T,F_1',\ldots,FN',F_1,\ldots,FN}(t,f_1',\ldots,f_N',f_1,\ldots,f_N),$$

relating the i-th underlying feature value, $f_i'$, of category t, to its measured counterpart $f_i$.

In general, one can assume the following property of the pre-marginalized classification distribution: $\bar{P}_{\bar{F},T|\bar{F}'}(\bar{f},t|\bar{f}') = P_{T|\bar{F}'}(\bar{f}|\bar{f}') = p_{T|\bar{F}'}(t|\bar{f}')$. That is, conditional on the true feature values, the measured feature value is independent of the truth class. When noise sources are translationally invariant in the feature space $\mathcal{F}$ (i.e., $\forall \bar{f}', \bar{f}, \Delta \bar{f} \in \mathcal{F}: p_{F|\bar{F}'}(\bar{f}|\bar{f}') = p_{\bar{F}|\bar{F}'}(\bar{f}-\Delta \bar{f}|\bar{f}'-\Delta \bar{f}))$, then the above assumption allows for the construction of the classification distribution from the pre-marginalized classification distribution via a simple convolution: $p_{\bar{F}|T}(\bar{f}|t) = [\sigma * p_{\bar{F}'|T}](\bar{f})$, where $\sigma(\bar{f}) \equiv p_{\bar{F}|\bar{F}'}(\bar{f}|0)$ is the uncertainty distribution of a measurement in the feature space $\mathcal{F}$.

One can calculate the conditional entropy in terms of the classification distribution, $\tilde{P}_{T,\bar{F}}(t,\bar{f})$:

$$H(T|\bar{F}) \equiv \sum_{t \in \mathcal{T}} \int\int_{\bar{f} \in \mathcal{F}} \tilde{P}_{T,\bar{F}}(t, \bar{f}) \log\left(\frac{p_{\bar{F}}(\bar{f})}{\tilde{P}_{T,\bar{F}}(t, \bar{f})}\right) d\bar{f}$$

This quantity is the expected remaining entropy of the categorical dimension T, conditional on a measurement of the feature dimension F, for the classification distribution $\tilde{P}_{T,\bar{F}}(t, \bar{f})$. This is the quantity that the sensor allocator 102 minimizes across targets to choose the optimal observation strategy. Before describing that minimization process, it can be useful to explore some other information theory qualities of $\tilde{P}_{T,\bar{F}}(t, \bar{f})$ to gain intuition for why $H(T|F)$ is the correct quantity to be minimizing.

When assessing the difficulty of a classification problem, one question one can ask is "how much total information exists about the categories?" Information theory has a simple mechanism to ask this question—the total information is equal to the entropy of the category distribution:

$$H(T) \equiv -\sum_{t \in \mathcal{T}} P_T(t)\log(P_T(t)),$$

where $P_T(t) = \iint_{\bar{f} \in \mathcal{F}} \tilde{P}_{T,\bar{F}}(t, \bar{f}) d\bar{f}$ is the distribution of categorical priors (or posteriors, if a measurement has already been taken).

Unfortunately, this theoretical calculation is incomplete in practice, because the total amount of information that exists is not equivalent to the total amount of information that can possibly be extracted from a particular set of features. The classification distribution, $\tilde{P}_{T,\bar{F}}(t, \bar{f})$, allows one to describe the entire classification problem as a single, high-dimensional distribution. With this classification distribution, one can answer questions about how much information about one dimension (namely, the category dimension, T) is contained in the other dimensions ($F_1, F_2, \ldots F_N$). The average amount of available classification information—when accounting for feature quality—is the difference between the initial entropy of the category distribution and the expected categorical posterior entropy after a measurement:

$$H(T) - H(T|\bar{F})$$

The average amount of available classification information, $H(T)-H(T|F)$ can be represented more efficiently, as shown below:

$$H(T) - H(T|\bar{F}) =$$

$$\sum_{t \in \mathcal{T}} P_T(t) \log\left(\frac{1}{P_T(t)}\right) - \sum_{t \in \mathcal{T}} \int\int_{\bar{f} \in \mathcal{F}} \tilde{P}_{T,\bar{F}}(t, \bar{f}) \log\left(\frac{p_{\bar{F}}(\bar{f})}{\tilde{P}_{T,\bar{F}}(t, \bar{f})}\right) d\bar{f} =$$

$$\sum_{t \in \mathcal{T}} \left(\int\int_{\bar{f} \in \mathcal{F}} \tilde{P}_{T,\bar{F}}(t, \bar{f}) d\bar{f}\right) \log\left(\frac{1}{P_T(t)}\right) -$$

$$\sum_{t \in \mathcal{T}} \int\int_{\bar{f} \in \mathcal{F}} \tilde{P}_{T,\bar{F}}(t, \bar{f}) \log\left(\frac{p_{\bar{F}}(\bar{f})}{\tilde{P}_{T,\bar{F}}(t, \bar{f})}\right) d\bar{f} =$$

$$\sum_{t \in \mathcal{T}} \int\int_{\bar{f} \in \mathcal{F}} \tilde{P}_{T,\bar{F}}(t, \bar{f}) \left(\log\left(\frac{1}{P_T(t)}\right) - \log\left(\frac{p_{\bar{F}}(\bar{f})}{\tilde{P}_{T,\bar{F}}(t, \bar{f})}\right)\right) d\bar{f} =$$

$$\sum_{t \in \mathcal{T}} \int\int_{\bar{f} \in \mathcal{F}} \tilde{P}_{T,\bar{F}}(t, \bar{f}) \log\left(\frac{\tilde{P}_{T,\bar{F}}(t, \bar{f})}{P_T(t) p_{\bar{F}}(\bar{f})}\right) d\bar{f} = I(T; \bar{F})$$

Henceforth, the mutual information between the categorical and feature dimensions, $I(T;\bar{F}) = H(T) - H(T|\bar{F})$, is referred to as the feature space capacity, $\kappa$; (note that this quantity is measured in bits):

$$\kappa_{\bar{F}} \equiv \sum_{t \in \mathcal{T}} \int\int_{\bar{f} \in \mathcal{F}} \tilde{P}_{T,\bar{F}}(t, \bar{f}) \log\left(\frac{\tilde{P}_{T,\bar{F}}(t, \bar{f})}{P_T(t) p_{\bar{F}}(\bar{f})}\right) d\bar{f}$$

In the context of information theory, the capacity can be seen as the information content that is shared between the category distribution and the measured feature distributions. The capacity of a feature-space indicates how much information about the categories can be gained from measurements of the features. As mentioned earlier, the quantity that the sensor allocator 102 is minimizing to choose an optimal observation strategy is H(T|F̄). One definition of feature-space capacity is $\kappa_{\bar{F}} = I(T; \bar{F}) = H(T) - H(T|\bar{F})$. Therefore, minimizing H(T|F̄) is equivalent to finding the observation that maximizes $\kappa_{\bar{F}}$, or in other words, maximizes the expected amount of information gained from the features.

Gaining intuition for the quantity $\kappa_{\bar{F}}$ can aid understanding of the behavior of the sensor allocator. There are multiple (equivalent) ways of interpreting the feature-space capacity. Two of these ways of interpreting the feature-space capacity are now discussed.

One interpretation of the feature space capacity $\kappa_{\bar{F}} = I(T; \bar{F})$ arises from considering a Kullback-Leibler divergence:

$$D_{KL}(p_X \| p_Y) \equiv \int p_X(x) \log\left(\frac{p_X(x)}{p_Y(x)}\right) dx$$

$D_{KL}$, also known as relative entropy, is a common pseudo-metric (it is not a true metric, as it is not symmetric) for measuring distances between distributions. Manipulating the definition of the category-feature mutual information yields the following relationship:

$$\kappa_{\bar{F}} = I(T; \bar{F}) = \sum_{t \in \mathcal{T}} \int\int_{\bar{f} \in \mathcal{F}} \tilde{P}_{T,\bar{F}}(t, \bar{f}) \log\left(\frac{\tilde{P}_{T,\bar{F}}(t, \bar{f})}{P_T(t) p_{\bar{F}}(\bar{f})}\right) d\bar{f}$$

$$= \sum_{t \in \mathcal{T}} \int\int_{\bar{f} \in \mathcal{F}} P_T(t) p_{\bar{F}|T}(\bar{f}|t) \log\left(\frac{P_T(t) p_{\bar{F}|T}(\bar{f}|t)}{P_T(t) p_{\bar{F}}(\bar{f})}\right) d\bar{f}$$

$$= \sum_{t \in \mathcal{T}} P_T(t) \int\int_{\bar{f} \in \mathcal{F}} p_{\bar{F}|T}(\bar{f}|t) \log\left(\frac{p_{\bar{F}|T}(\bar{f}|t)}{p_{\bar{F}}(\bar{f})}\right) d\bar{f} =$$

$$\mathbb{E}_T\left[D_{KL}(p_{\bar{F}|T} \| p_{\bar{F}})\right]$$

Note that $p_{\bar{F}|T}(\bar{f}|t_i) = \tilde{P}_{T,\bar{F}}(t_i, \bar{f}) / P_T(t_i)$ is the likelihood function for hypothesis i, while $p_{\bar{F}}(\bar{f}) = \Sigma_i \tilde{P}_{T,\bar{F}}(t_i, \bar{f})$ is the overall likelihood function for the entire population of hypotheses—therefore, $\kappa_{\bar{F}}$ is the average divergence between the individual and population likelihood functions. As the average divergence between each individual likelihood function and the overall population likelihood function grows, it becomes easier (given measurements in the feature-space of the likelihood functions) to extract information about the identity of a particular member of the population—i.e., the feature-space capacity increases.

Another interpretation of the feature space capacity $\kappa_{\bar{F}} = I(T; \bar{F})$ arises from the field of Bayesian inference:

$$\kappa_{\bar{F}} = I(T; \bar{F}) = \sum_{t \in \mathcal{T}} \int\int_{\bar{f} \in \mathcal{F}} \tilde{P}_{T,\bar{F}}(t, \bar{f}) \log\left(\frac{\tilde{P}_{T,\bar{F}}(t, \bar{f})}{P_T(t) p_{\bar{F}}(\bar{f})}\right) d\bar{f}$$

$$= \sum_{t \in \mathcal{T}} \int\int_{\bar{f} \in \mathcal{F}} \tilde{P}_{T,\bar{F}}(t, \bar{f}) \log\left(\frac{1}{P_T(t)} \cdot \frac{P_T(t) p_{\bar{F}|T}(\bar{f}|t)}{\sum_{\tau \in \mathcal{T}} P_T(\tau) p_{\bar{F}|T}(\bar{f}|\tau)}\right) d\bar{f}$$

$$= \sum_{t \in \mathcal{T}} \int\int_{\bar{f} \in \mathcal{F}} \tilde{P}_{T,\bar{F}}(t, \bar{f}) \log\left(\frac{\tilde{P}_{T,\bar{F}}(t, \bar{f})}{P_T(t)}\right) d\bar{f}$$

(this result can also be seen directly from the definition of conditional probability, $$\frac{\tilde{P}_{T,\bar{F}}(t, \bar{f})}{p_{\bar{F}}(\bar{f})} = P_{T|F}(t|\bar{f}))$$

Here, $P_{T|\bar{F}}(t|\bar{f})$ is the Bayesian posterior probability on hypothesis t given observation $\bar{f}$, and $P_T(t)$ is the Bayesian prior on that same hypothesis. Therefore, when $\tilde{P}_{T,\bar{F}}(t, \bar{f})$ is interpreted as the joint probability distribution between categories T and feature-space $\bar{F}$, then $\kappa_{\bar{F}}$ is the mean log posterior-to-prior ratio. As the mean log posterior-to-prior ratio grows, there is more information to be gained by making measurements within the given feature-space—i.e., the feature-space capacity increases.

An explanation of how the sensor allocator 102 finds an optimal observation strategy without a priority list is now described. A method used by the sensor allocator 102 in finding an optimal observation strategy when there is an object priority list is provided after. Consider an ensemble of targets, $\mathcal{A} = \{\alpha_1, \ldots, \alpha_m\}$, with the classification feature-space $\mathcal{F} = \{f_1, f_2, \ldots, f_N\}$. Without loss of generality, one can say that each feature has a one-to-one correspondence to an available sensor to be tasked. One can write $T^{\alpha_m}$ as the categorical distribution associated with the set of hypotheses for target am. Furthermore, assume that $\forall m \neq m'$, $P_{T\alpha_m, T\alpha_{m'}}(t^{\alpha_m}, t^{\alpha_{m'}}) = P_{T\alpha_m}(t^{\alpha_m}) \cdot P_{T\alpha_{m'}}(t^{\alpha_{m'}})$. That is, the hypothesis probabilities for two different targets are independent.

Define an observational strategy, s, as an M×N binary matrix indicating which sensors are tasked to which targets. In other words, if $s_{m,n} = 1$, then strategy s would task sensor n to target m. Note that the sum down each column of s must be unity, but the sum across a row can lie between 0 and N (inclusive).

$\bar{F}_s^{\alpha_m}$ is the distribution associated with the set of features that would be measured by strategy s for target $\alpha_m$. That is, the feature $f_n$ is in $\bar{F}_s^{\alpha_m}$ iff $s_{m,n} = 1$.

Define the total expected entropy, $\Lambda_{\mathcal{A}}(s)$, of strategy s as the sum of the expected entropies of the posterior lists of the ensemble of targets $\mathcal{A}$, conditional on having measured the features for each target as dictated by s. As previously described, the expected entropy of a posterior list over all possible measurements is equal to the conditional entropy—therefore:

$$\Lambda_{\mathcal{A}}(s) \equiv \sum_{m=1}^{M} H(T^{\alpha_m} | \bar{F}_s^{\alpha_m})$$

Let $\mathcal{S} = \{s^1, s^2, \ldots, s^L\}$ be the set of all unique strategies that can be defined for the ensemble of targets $\mathcal{A}$ and the set of features/sensors $\mathcal{F}$. The optimal strategy, $s^{opt}$, is the strategy for which the ensemble's conditional joint entropy is minimized:

$$s^{opt} \equiv \min_{s \in \mathcal{S}}(H_s(T^{\alpha_1}, \ldots, T^{\alpha_M} | \overline{F}))$$

In general, estimating the joint entropy is not possible. However, due to the assumption of independent inter-target hypothesis probabilities (namely, $P_{T\alpha m, T\alpha m} = P_{T\alpha m} \cdot P_{T\alpha m'}$), one can write the conditional joint entropy for strategy s as equal to the total conditional entropy across all targets in the ensemble:

$$H_s(T^{\alpha_1}, \ldots, T^{\alpha_M} | \overline{F}) = \sum_{m=1}^{M} H(T^{\alpha_M} | \overline{F}_s^{\alpha_m}) = \Lambda_{\mathcal{A}}(s)$$

Therefore, the optimal non-prioritized strategy can be found by minimizing the sum of the individual target conditional entropies:

$$s^{opt} = \min_{s \in \mathcal{S}}(\Lambda_{\mathcal{A}}(s))$$

A constrained optimization problem to allow for optimal resource management with prioritized targets is now constructed. Define the object priority list 122 as comprising $a^j$ and $E_{max}^j$. Define $\alpha^j$ as the ensemble's j-th priority layer (of J total layers), such that $a^j$ is a partition of $\mathcal{A}$ (i.e., $a^i \cap a^{j'} = \emptyset$ if $j \neq j'$, and $\cup_{j=1}^{J} a^j = \mathcal{A}$). Also define $E_{max}^j$ as a threshold entropy level associated with the j-th priority layer. Alternatively, if a user has provided a minimum classification posterior requirement, $P_0$, then this requirement can be converted into an entropy requirement by $$E_{max}^j = P_0 \log\left(\frac{1}{P_0}\right) + (1 - P_0)\log\left(\frac{1}{1 - P_0}\right).$$

The object priority list 122 comprising $a^j$ and $E_{max}^j$ are inputs to this optimization problem.

Now, let the set of constraint functions, $L_j(s)$, be defined such that $L_j(s)$ is unity if and only if, under strategy s, the member-averaged total joint entropy of priority layer $a^j$ is less than or equal to its corresponding threshold entropy:

$$L_j(s) = \begin{cases} 1, & \Lambda_{a^j}(s) \leq |a^j| \cdot E_{max}^j \\ 0, & \text{otherwise} \end{cases}$$

The depth d(s) of strategy s is the lowest-priority layer at which the given strategy does not violate any constraint at that priority layer or higher:

$$d(s) = \max_{j \leq J}\left(j : \sum_{j'=1}^{j} L_{j'}(s) = j\right)$$

Define $D(\mathcal{S}.)$ as the maximum depth of the set of strategies $\mathcal{S}.$:

$$D(\mathcal{S}) = \max_{s \in \mathcal{S}}(d(s))$$

Define the set of considered strategies, $\mathcal{S}.' \in \mathcal{S}.$, as all strategies for which the depth is equal to the maximum depth:

$$s \in \mathcal{S} \text{ 'iff } d(s) = D(S)$$

Define the set of considered targets, $\mathcal{A}' \in \mathcal{A}$, as the set of targets that are members of all priority layers of depth $D(\mathcal{S}.) + 1$ or less:

$$\alpha \in \mathcal{A}' \text{ iff } \alpha \in a^{j \leq D(\mathcal{S}.)+1}$$

The optimal prioritized strategy, $s^{opt'} \in \mathcal{S}.'$, is the member of the set of considered strategies for which the total joint entropy is minimized over the set of considered targets:

$$s^{opt'} = \min_{s \in S'}(\Lambda_{\mathcal{A}'}(s))$$

A proof that a minimum classification posterior requirement, $P_0$, can be converted into an entropy requirement, $E_{max}^j$, is now provided.

Given that the threshold posterior has been reached $$\left(\text{i.e., } \max_{t \in \mathcal{T}}\left(P_{T|F}(t|\overline{f})\right) \geq P_0,\right),$$

there are two possible resulting bounding states of the entropy of the categorical distribution, $H(T|\overline{F})$, following a set of measurements:

$$P_0\log\left(\frac{1}{P_0}\right) + (1 - P_0)\log\left(\frac{1}{1 - P_0}\right) \leq$$

$$H(T|\overline{F}) \leq P_0\log\left(\frac{1}{P_0}\right) + (1 - P_0)\log\left(\frac{N-1}{1 - P_0}\right)$$

To simplify, one can define $$H_{P_0} \equiv P_0\log\left(\frac{1}{P_0}\right) + (1 - P_0)\log\left(\frac{1}{1 - P_0}\right).$$

Therefore, the entropy of the categorical distribution, given that the posterior threshold has been reached, is bounded as:

$$H_{P_0} \leq H(T|\overline{F}) \leq H_{P_0} + (1 - P_0)\log(N-1)$$

In other words, given a (Bayesian) requirement on the achieved maximum posterior, one can define the range of possible entropy states that the classification distribution will be in, assuming that the maximum posterior threshold has been achieved. Therefore, the most conservative conversion of a user-provided posterior requirement, $P_0$, into a entropy requirement $E_{max}^j$, yields the expression $$E_{max}^j = H_{P_0} = P_0\log\left(\frac{1}{P_0}\right) + (1 - P_0)\log\left(\frac{1}{1 - P_0}\right).$$

Figure 2:
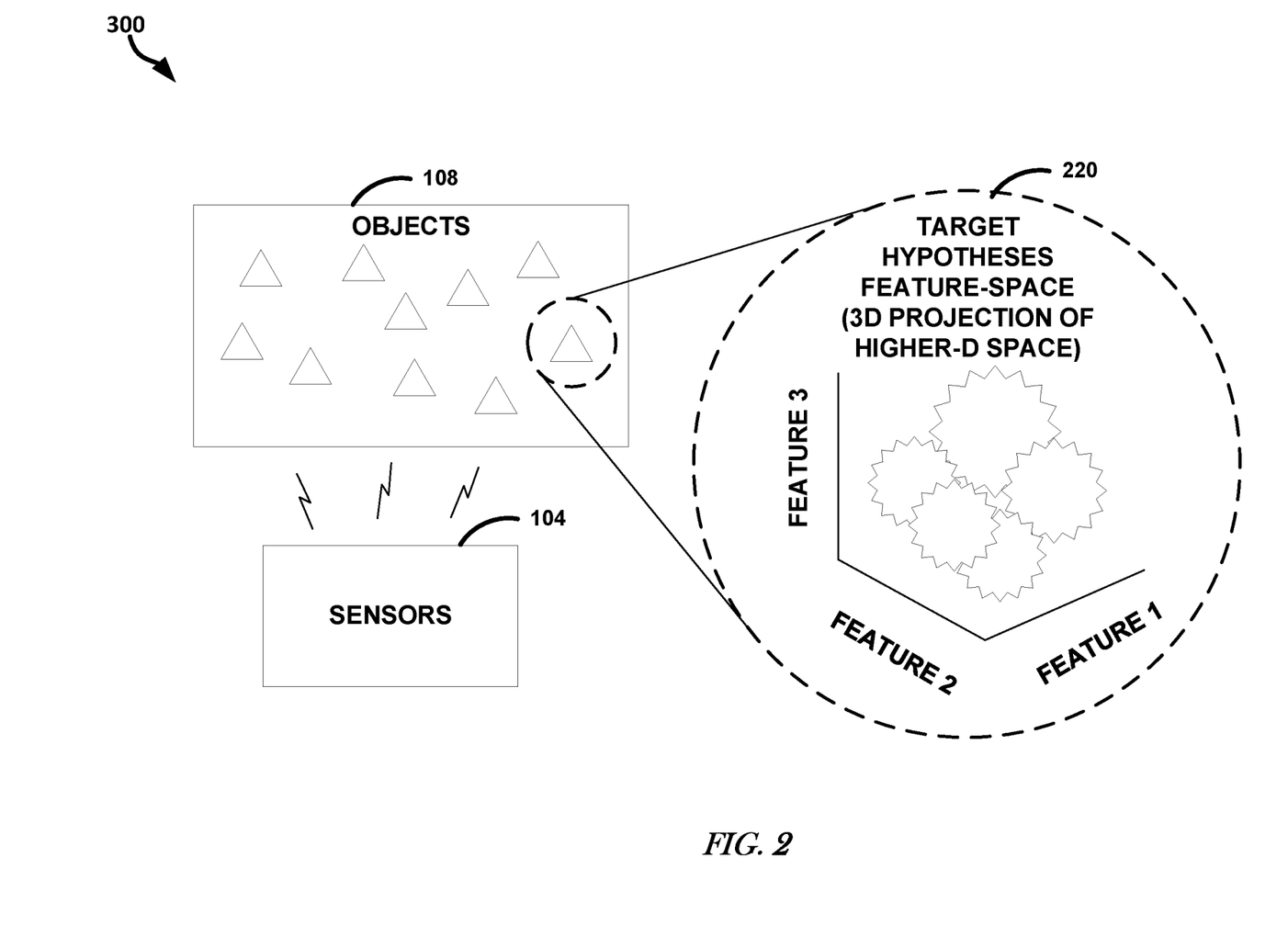
FIG. 2 illustrates, by way of example, a conceptual diagram of an embodiment of operation of the sensor allocator.

FIG. 2 illustrates, by way of example, a conceptual diagram of an embodiment of operations 300 of the sensor allocator 102. The sensors 104 are directed, by the sensor allocator 102, to measure features of assigned objects 108. A feature space 220 represents the possible measured values for features of a given object. The sensor allocator 102 determines a conditional entropy based on results from the classifier 106 and possible sensor assignments for a next round of feature gathering. The sensor allocator 102 reduces a sum of the conditional entropies so that expected information gained is maximized from a next round of feature gathering.

The behavior of the sensor allocator 102 is a direct consequence of the interplay between and relative performance of (i) the classifier 106 and (ii) the intrinsic usefulness of the features 118 themselves. Here, a set of metrics that can be used to quantify and compare these aspects of system performance are described. These metrics are not required and thus are not used in all embodiments, but can aid a practitioner in the implementation thereof.

The feature-space capacity $\kappa_{\overline{F}}$ represents the expected information content that can be extracted about the categories from a measurement of the features. The total information content that is contained within the category distribution itself is the categorical entropy (or self-information), I(T; T). This leads to a natural measure for the utility of a particular feature-space (in the context of the sensor allocator 102: the utility of a particular choice of sensors 104 to be pointed at a particular object 108 (sometimes called "target") towards classification of the corresponding categories, which is referred to as the fractional capacity, $f_{\overline{F}}$:

$$f_{\overline{F}} \equiv \frac{\kappa_{\overline{F}}}{I(T; T)} \leq 1$$

The fractional capacity gives the fraction of all available information about the given set of categories that can be extracted from the given feature space, irrespective of what particular algorithm is used to extract that information. The feature-space capacity and fractional capacity can be calculated a priori, based purely on the set of feature distributions that are associated with a library of interest—i.e., this calculation does not rely on the existence of any implementation of a specific classifier or classification algorithm.

If a specific classification algorithm, denoted as $\Psi$, has been implemented, then the mean amount of information that was extracted in situ by that algorithm, $\hat{I}^{\Psi}$, can be estimated by recording the reported posterior values for each hypothesis in the algorithm's library (for a series of experiments), along with the truth hypothesis:

$$\hat{I}^{\Psi} \equiv \frac{1}{N}\sum_{i=1}^{N}\log\left(\frac{P_{i,t_i}^{\Psi}}{\rho_{t_i}}\right)$$

where: $P_{i,j}^{\Psi}$ is the posterior for the j-th hypothesis in the i-th experiment, as reported by $\Psi$, $\rho_j$ is the prior associated with the j-th hypothesis, and $t_i$ is the index of the true hypothesis of the i-th experiment.

Two relative measures of an algorithm's effectiveness are now defined. The feature-space efficacy, $\eta_{\overline{F}}^{\Psi}$, represents the fraction of categorical information that was extracted by the algorithm $\Psi$, relative to the categorical information that was available within the feature-space (i.e., the capacity):

$$\eta_{\overline{F}}^{\Psi} \equiv \frac{\hat{I}_{\Psi}}{\kappa_{\overline{F}}} \leq 1$$

The categorical efficacy, $\eta_0^{\Psi}$, represents the fraction of categorical information that was extracted by the algorithm $\Psi$, relative to the total categorical information (i.e., the categorical entropy):

$$\eta_0^{\Psi} \equiv \frac{\hat{I}_{\Psi}}{I(T; T)} = f_{\overline{F}} \cdot \eta_{\overline{F}}^{\Psi} \leq \eta_{\overline{F}}^{\Psi}$$

TABLE 2 definitation of terms.

| PARAMETER | SYMBOL | DEFINITION | CONSTRAINTS | UNITS |
|---|---|---|---|---|
| FEATURE-SPACE CAPACITY | $\kappa_{\overline{F}}$ | $I(T; \overline{F})$ | $0 \leq \kappa_{\overline{F}}$ | BITS |
| FRACTIONAL CAPACITY | $f_{\overline{F}}$ | $\kappa_{\overline{F}} / I(T; T)$ | $0 \leq f_{\overline{F}} \leq 1$ | NONE |
| ALGORITHM MEAN INFORMATION | $\hat{I}^{\Psi}$ | $\frac{1}{N}\sum_{i=1}^{N}\log\left(\frac{P_{i,t_i}^{\Psi}}{\rho_{t_i}}\right)$ | $0 \leq \hat{I}^{\Psi}$ | BITS |
| ALGORITHM FEATURE-SPACE EFFICACY | $\eta_{\overline{F}}^{\Psi}$ | $\frac{\hat{I}^{\Psi}}{\kappa_{\overline{F}}}$ | $0 \leq \eta_{\overline{F}}^{\Psi} \leq 1$ | NONE |
| ALGORITHM CATEGORICAL EFFICACY | $\eta_0^{\Psi}$ | $\frac{\hat{I}^{\Psi}}{I(T; T)}$ | $0 \leq \eta_0^{\Psi} \leq 1$ | NONE |

A new classification object has been introduced, the classification distribution, $\hat{P}_T(t, \hat{I})$. How to construct the object has also been introduced. The concept of the capacity of a feature-space towards classification was also provided. Using these terms, a fractional capacity can be defined. A feature-space's fractional capacity is how useful that feature-space is for classification.

An algorithm's efficacy is how good the algorithm is at extracting the available information. These metrics allow one to directly measure how effective a classification algorithm is, as well as how much information can possibly be gleaned from the feature space upon which that algorithm acts.

The capacity can be calculated a priori (before the algorithm is actually defined), simply by examining the feature-space that will be measured, while the efficacy can be empirically measured from the reported posterior values for that algorithm.

Figure 3:
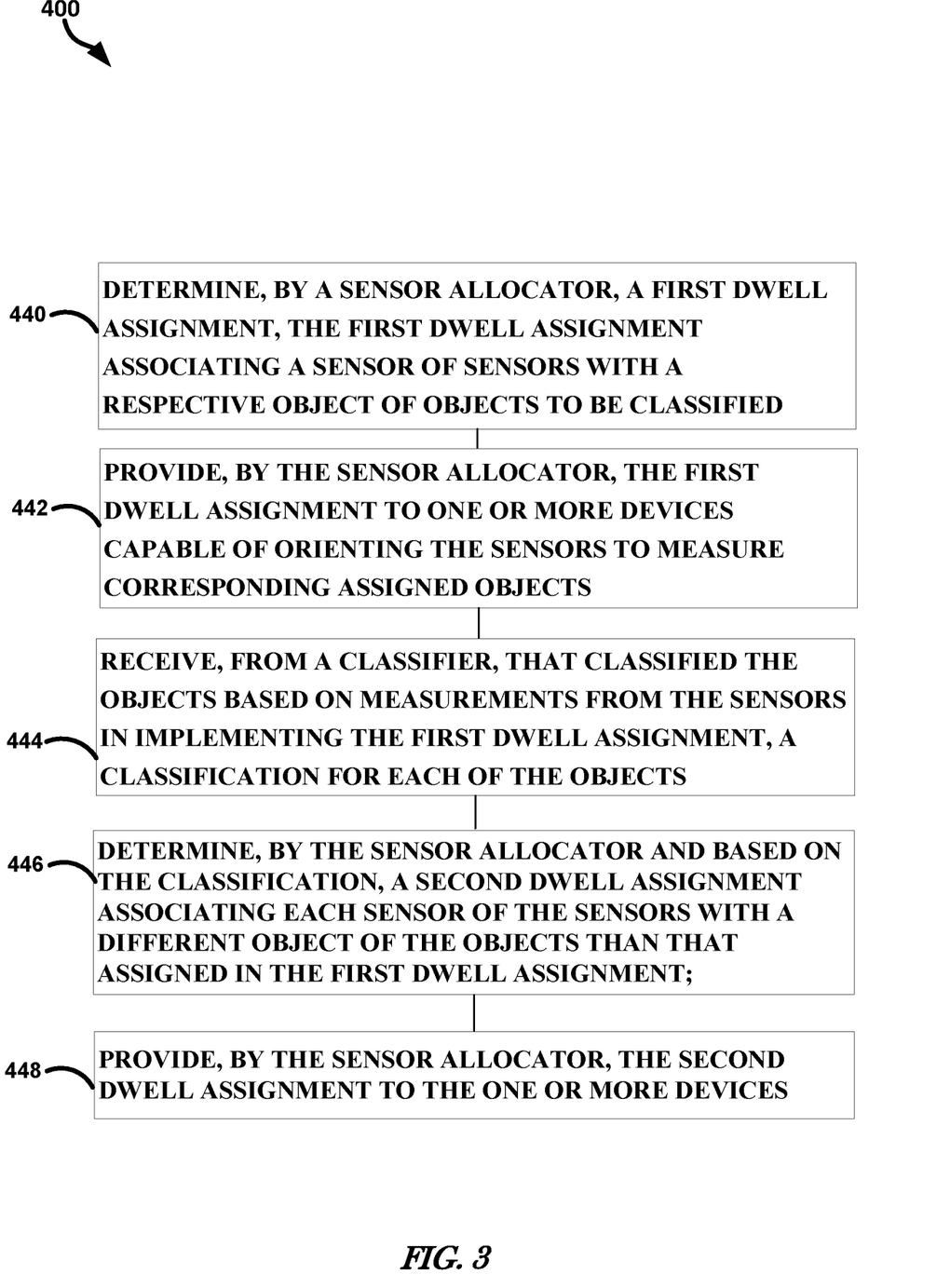
FIG. 3 illustrates, by way of example, a diagram of an embodiment of a method for object classification by optimal sensor allocation.

FIG. 3 illustrates, by way of example, a diagram of an embodiment of a method 400 for sensor scheduling and object classification. The method 400 as illustrated includes determining, by a sensor allocator, a first dwell assignment, the first dwell assignment associating a sensor of sensors with a respective object of objects to be classified, at operation 440; providing, by the sensor allocator, the first dwell assignment to one or more devices capable of orienting the sensors to measure corresponding assigned objects, at operation 442; receiving, from a classifier, that classified the objects based on measurements from the sensors in implementing the first dwell assignment, a classification for each of the objects, at operation 444; determining, by the sensor allocator and based on the classification, a second dwell assignment associating each sensor of the sensors with a different object of the objects than that assigned in the first dwell assignment, at operation 446; and providing, by the sensor allocator, the second dwell assignment to the one or more devices, at operation 448.

The first and second dwell assignments can minimize an expected entropy. Minimizing the expected entropy can include minimizing a sum of expected entropies of all the assignments of the first dwell assignment. The expected entropy can be determined based on a probability distribution associated with a set of possible classifications for a given object of the objects given a probability distribution associated with a set of sensor measurement that would be measured by the first dwell assignment for the given object.

The method 400 can further include receiving, from a classifier, that classified the objects based on measurements from the sensors in implementing the second dwell assignment, a second classification for each of the objects. The method 400 can further include determining, by the sensor allocator and based on the second classification, a third dwell assignment associating each sensor of the sensors with a different object of the objects than that assigned in the first dwell assignment and the second dwell assignment.

The method 400 can further include receiving, by the sensor allocator, a priority list for the objects, the priority list including a partition of the objects and corresponding priority levels for classifying the objects, the priority levels including a higher priority level and a lower priority level. The first and second dwell assignments can be determined based on the priority list.

The first and second dwell assignments can be determined by determining, of possible dwell assignments, which dwell assignments yield a corresponding expected entropy for each of the objects in the higher priority level that is below a first specified threshold entropy resulting in a first subset of dwell assignments. The first and second dwell assignments can further be determined by determining whether any dwell assignments of the first subset of dwell assignments yield a corresponding expected entropy for each of the objects in the lower priority level that is below a second specified threshold entropy. The first and second dwell assignments can further be determined by responsive to determining that there is no dwell assignment of the first subset of dwell assignments that yields a corresponding expected entropy for each of the objects in the lower priority level that is below the second specified threshold entropy, determining which dwell assignment of the first subset of the dwell assignments yields a lowest expected entropy for the objects in the lower priority level resulting in a determined dwell assignment. The first and second dwell assignments can further be determined by providing the determined dwell assignment to the one or more devices.

AI is a field concerned with developing decision-making systems to perform cognitive tasks that have traditionally required a living actor, such as a person. NNs are computational structures that are loosely modeled on biological neurons. Generally, NNs encode information (e.g., data or decision making) via weighted connections (e.g., synapses) between nodes (e.g., neurons). Modern NNs are foundational to many AI applications, such as classification, device behavior modeling (as in the present application) or the like. The classifier 106, or other component or operation can include or be implemented using one or more NNs.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights.

In some examples, initial weights may be randomly selected. Training data is fed into the NN, and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 4:
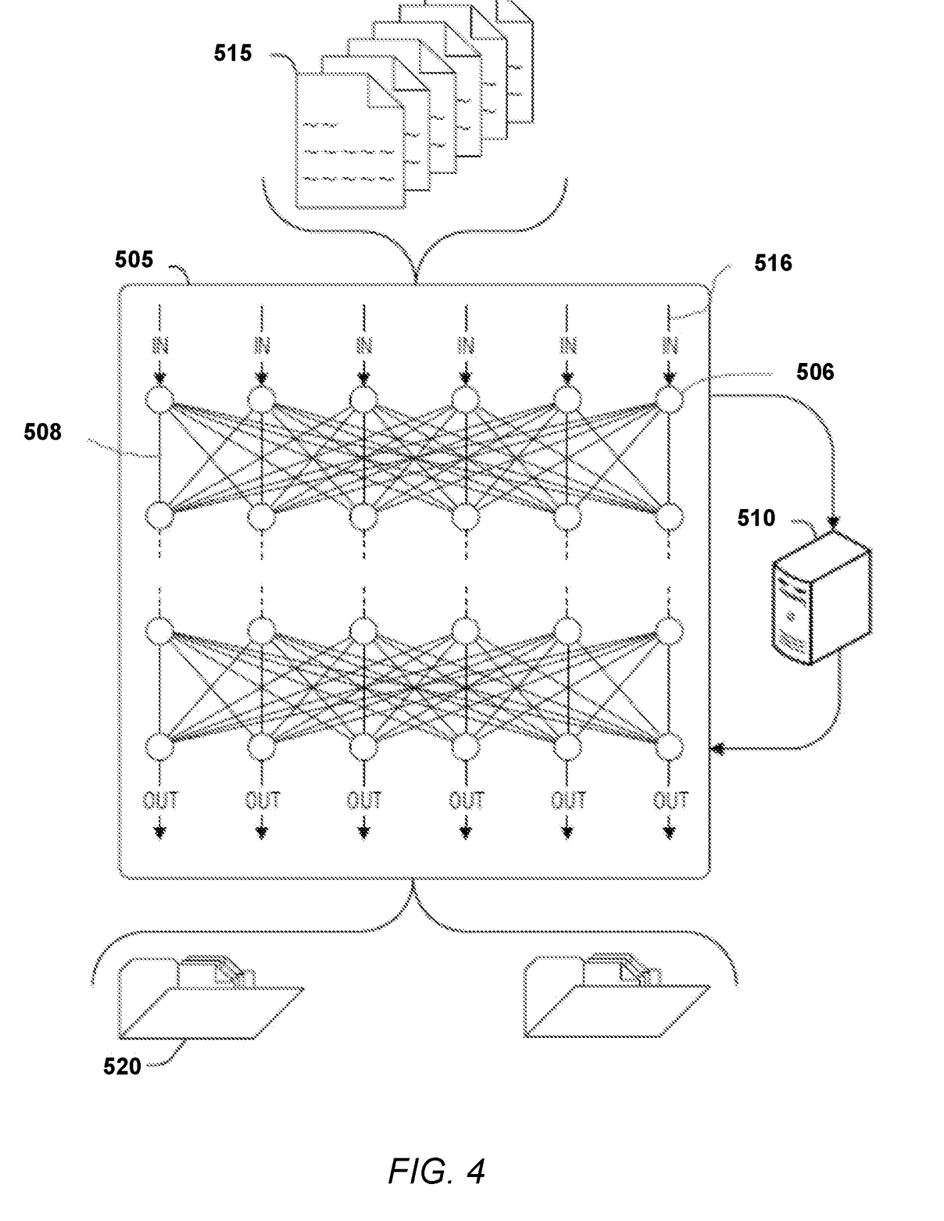
FIG. 4 is a block diagram of an example of an environment including a system for neural network (NN) training.

FIG. 4 is a block diagram of an example of an environment including a system for neural network (NN) training. The system includes an artificial NN (ANN) 505 that is trained using a processing node 510. The processing node 510 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 505, or even different nodes 506 within layers. Thus, a set of processing nodes 510 is arranged to perform the training of the ANN 505. The classifier 106, or the like, can be trained using the system.

The set of processing nodes 510 is arranged to receive a input data 516 for the ANN 505. The ANN 505 comprises a set of nodes 506 arranged in layers (illustrated as rows of nodes 506) and a set of inter-node weights 508 (e.g., parameters) between nodes in the set of nodes. In an example, the input data 526 can be a subset of a complete training set. Here, the subset may enable processing nodes with limited storage resources to participate in training the ANN 505.

The training data may include multiple numerical values representative of a domain, such as an image feature, or the like. Each value of the input data 516 to be classified after ANN 505 is trained, is provided to a corresponding node 506 in the first layer or input layer of ANN 505. The values propagate through the layers and are changed by the objective function.

As noted, the set of processing nodes is arranged to train the neural network to create a trained neural network. After the ANN is trained, data input into the ANN will produce valid classifications 520 (e.g., the input data 515 will be assigned into categories), for example. The training performed by the set of processing nodes 507 is iterative. In an example, each iteration of the training the ANN 505 is performed independently between layers of the ANN 505. Thus, two distinct layers may be processed in parallel by different members of the set of processing nodes. In an example, different layers of the ANN 505 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 506 (e.g., neurons) are trained independently. In an example, the nodes are trained on different hardware.

Figure 5:
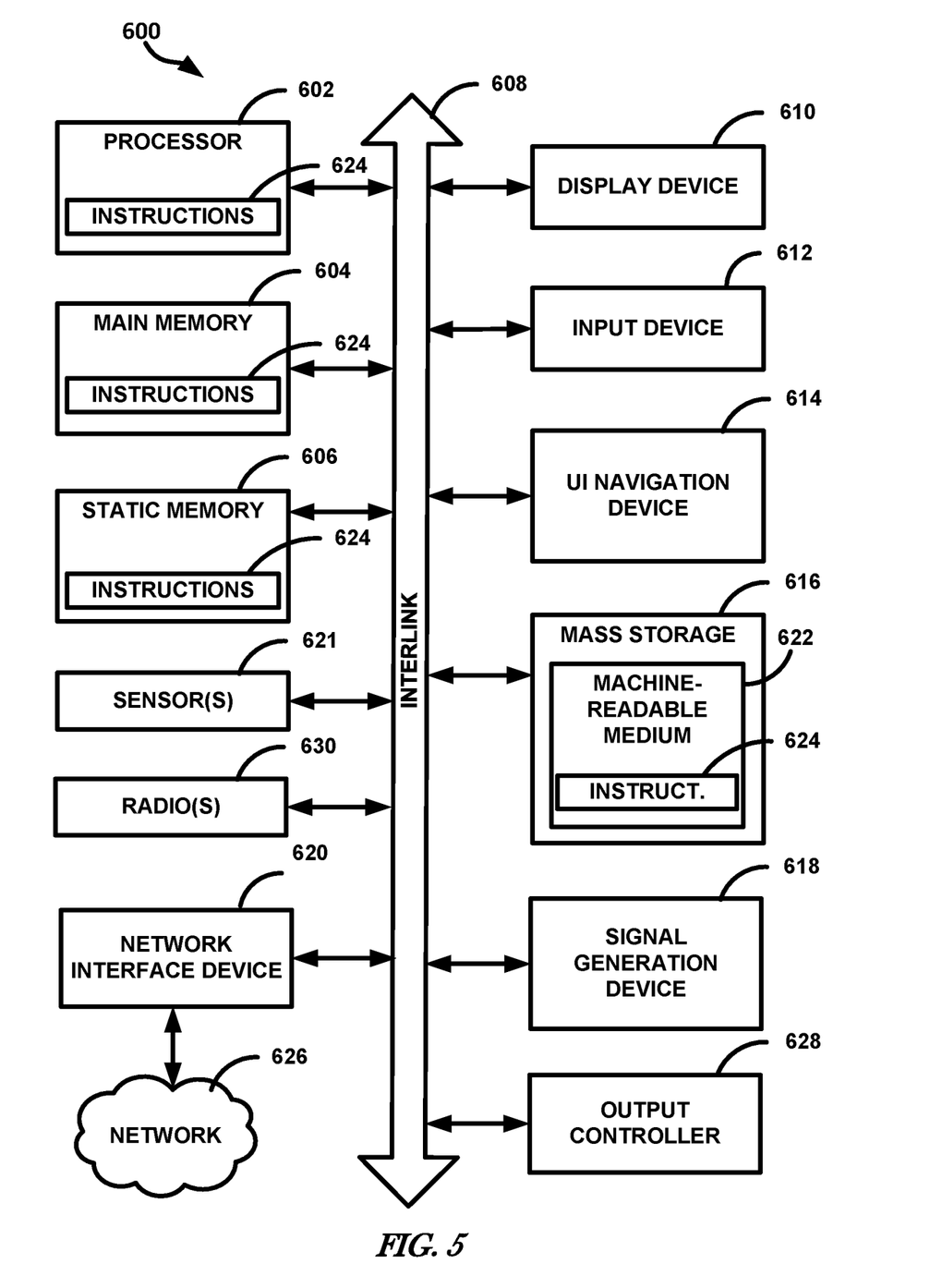
FIG. 5 illustrates, by way of example, a block diagram of an embodiment of a machine in the example form of a computer system within which instructions, for causing the machine to perform any one or more of the methods or techniques discussed herein, may be executed.

FIG. 5 illustrates, by way of example, a block diagram of an embodiment of a machine in the example form of a computer system 600 within which instructions, for causing the machine to perform any one or more of the methods or techniques discussed herein, may be executed. One or more of the sensor allocator 102, sensors 104, devices 120, classifier 106, method 400, or other component, operation, or technique, can include, or be implemented or performed by one or more of the components of the computer system 600. In a networked deployment, the machine may operate in the capacity of a server or a client machine in server-client network environment, or as a peer machine in a peer-to-peer (or distributed) network environment. The machine may be a personal computer (PC), server, a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a mass storage unit 616, a signal generation device 618 (e.g., a speaker), a network interface device 620, and a radio 630 such as Bluetooth, WWAN, WLAN, and NFC, permitting the application of security controls on such protocols.

The mass storage unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 620 and any one of a number of well-known transfer protocols (e.g., HTTPS). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Additional Examples

Example 1 includes a method for sensor scheduling and object classification comprising determining, by a sensor allocator, a first dwell assignment, the first dwell assignment associating a sensor of sensors with a respective object of objects to be classified, providing, by the sensor allocator, the first dwell assignment to one or more devices capable of orienting the sensors to measure corresponding assigned objects, receiving, from a classifier, that classified the objects based on measurements from the sensors in implementing the first dwell assignment, a classification for each of the objects, determining, by the sensor allocator and based on the classification, a second dwell assignment associating each sensor of the sensors with a different object of the objects than that assigned in the first dwell assignment, and providing, by the sensor allocator, the second dwell assignment to the one or more devices.

In Example 2, Example 1 further includes, wherein the first and second dwell assignments minimizes an expected entropy.

In Example 3, Example 2 further includes, wherein minimizing the expected entropy includes minimizing a sum of expected entropies of all the assignments of the first dwell assignment.

In Example 4, Example 3 further includes, wherein the expected entropy is determined based on a probability distribution associated with a set of possible classifications for a given object of the objects given a probability distribution associated with a set of sensor measurement that would be measured by the first dwell assignment for the given object.

In Example 5, at least one of Examples 1-4 further includes receiving, from a classifier, that classified the objects based on measurements from the sensors in implementing the second dwell assignment, a second classification for each of the objects, and determining, by the sensor allocator and based on the second classification, a third dwell assignment associating each sensor of the sensors with a different object of the objects than that assigned in the first dwell assignment and the second dwell assignment.

In Example 6, at least one of Examples 1-5 further includes receiving, by the sensor allocator, a priority list for the objects, the priority list including a partition of the objects and corresponding priority levels for classifying the objects, the priority levels including a higher priority level and a lower priority level, and wherein the first and second dwell assignments are determined based on the priority list.

In Example 7, Example 6 further includes, wherein the first and second dwell assignments are determined by determining, of possible dwell assignments, which dwell assignments yield a corresponding expected entropy for each of the objects in the higher priority level that is below a first specified threshold entropy resulting in a first subset of dwell assignments, determining whether any dwell assignments of the first subset of dwell assignments yield a corresponding expected entropy for each of the objects in the lower priority level that is below a second specified threshold entropy, responsive to determining that there is no dwell assignment of the first subset of dwell assignments that yields a corresponding expected entropy for each of the objects in the lower priority level that is below the second specified threshold entropy, determining which dwell assignment of the first subset of the dwell assignments yields a lowest expected entropy for the objects in the lower priority level resulting in a determined dwell assignment, and providing the determined dwell assignment to the one or more devices.

Example 8 includes a non-transitory machine-readable medium including instructions that, when executed by a machine, cause the machine to perform operations for sensor scheduling and object classification, the operations comprising determining, by a sensor allocator, a first dwell assignment, the first dwell assignment associating a sensor of sensors with a respective object of objects to be classified, providing, by the sensor allocator, the first dwell assignment to one or more devices capable of orienting the sensors to measure corresponding assigned objects, receiving, from a classifier, that classified the objects based on measurements from the sensors in implementing the first dwell assignment, a classification for each of the objects, determining, by the sensor allocator and based on the classification, a second dwell assignment associating each sensor of the sensors with a different object of the objects than that assigned in the first dwell assignment, and providing, by the sensor allocator, the second dwell assignment to the one or more devices.

In Example 9, Example 8 further includes, wherein the first and second dwell assignments minimizes an expected entropy.

In Example 10, Example 9 further includes, wherein minimizing the expected entropy includes minimizing a sum of expected entropies of all the assignments of the first dwell assignment.

In Example 11, Example 10 further includes, wherein the expected entropy is determined based on a probability distribution associated with a set of possible classifications for a given object of the objects given a probability distribution associated with a set of sensor measurement that would be measured by the first dwell assignment for the given object.

In Example 12, at least one of Examples 8-11 further includes, wherein the operations further comprise receiving, from a classifier, that classified the objects based on measurements from the sensors in implementing the second dwell assignment, a second classification for each of the objects, and determining, by the sensor allocator and based on the second classification, a third dwell assignment associating each sensor of the sensors with a different object of the objects than that assigned in the first dwell assignment and the second dwell assignment.

In Example 13, at least one of Examples 8-12 further includes, wherein the operations further comprise receiving, by the sensor allocator, a priority list for the objects, the priority list including a partition of the objects and corresponding priority levels for classifying the objects, the priority levels including a higher priority level and a lower priority level, and wherein the first and second dwell assignments are determined based on the priority list.

In Example 14, Example 13 further includes, wherein the first and second dwell assignments are determined by determining, of possible dwell assignments, which dwell assignments yield a corresponding expected entropy for each of the objects in the higher priority level that is below a first specified threshold entropy resulting in a first subset of dwell assignments, determining whether any dwell assignments of the first subset of dwell assignments yield a corresponding expected entropy for each of the objects in the lower priority level that is below a second specified threshold entropy, responsive to determining that there is no dwell assignment of the first subset of dwell assignments that yields a corresponding expected entropy for each of the objects in the lower priority level that is below the second specified threshold entropy, determining which dwell assignment of the first subset of the dwell assignments yields a lowest expected entropy for the objects in the lower priority level resulting in a determined dwell assignment, and providing the determined dwell assignment to the one or more devices.

Example 15 includes a system comprising sensors, a sensor allocator configured to
  determine a first dwell assignment, the first dwell assignment associating a sensor of the sensors with a respective object of objects to be classified, and provide the first dwell assignment to one or more devices capable of orienting the sensors to measure corresponding assigned objects, a classifier configured to provide classification for each of the objects based on measurements from the sensors in implementing the first dwell assignment, the sensor allocator further configured to determine, by the sensor allocator and based on the classification, a second dwell assignment associating each sensor of the sensors with a different object of the objects than that assigned in the first dwell assignment, and provide, by the sensor allocator, the second dwell assignment to the one or more devices.

In Example 16, Example 15 further includes, wherein the first and second dwell assignments minimizes an expected entropy.

In Example 17, Example 16 further includes, wherein minimizing the expected entropy includes minimizing a sum of expected entropies of all the assignments of the first dwell assignment.

In Example 18, Example 17 further includes, wherein the expected entropy is determined based on a probability distribution associated with a set of possible classifications for a given object of the objects given a probability distribution associated with a set of sensor measurement that would be measured by the first dwell assignment for the given object.

In Example 19, at least one of Examples 15-18 further includes, wherein the sensor allocator is further configured to receive, from the classifier, that classified the objects based on measurements from the sensors in implementing the second dwell assignment, a second classification for each of the objects, and determining, based on the second classification, a third dwell assignment associating each sensor of the sensors with a different object of the objects than that assigned in the first dwell assignment and the second dwell assignment.

In Example 20, at least one of Examples 15-19 further includes, wherein the sensor allocator is further configured to receive a priority list for the objects, the priority list including a partition of the objects and corresponding priority levels for classifying the objects, the priority levels including a higher priority level and a lower priority level, wherein the first and second dwell assignments are determined based on the priority list, determine, of possible dwell assignments, which dwell assignments yield a corresponding expected entropy for each of the objects in the higher priority level that is below a first specified threshold entropy resulting in a first subset of dwell assignments, determine whether any dwell assignments of the first subset of dwell assignments yield a corresponding expected entropy for each of the objects in the lower priority level that is below a second specified threshold entropy, responsive to determining that there is no dwell assignment of the first subset of dwell assignments that yields a corresponding expected entropy for each of the objects in the lower priority level that is below the second specified threshold entropy, determine which dwell assignment of the first subset of the dwell assignments yields a lowest expected entropy for the objects in the lower priority level resulting in a determined dwell assignment, and provide the determined dwell assignment to the one or more devices.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. A method for sensor scheduling and object classification comprising:
   determining, by a sensor allocator, a first dwell assignment, the first dwell assignment associating a sensor of sensors with a respective object of objects to be classified;
   providing, by the sensor allocator, the first dwell assignment to one or more devices capable of orienting the sensors to measure corresponding assigned objects;
   receiving, from a classifier, that classified the objects based on measurements from the sensors in implementing the first dwell assignment, a classification for each of the objects;
   receiving, by the sensor allocator, a priority list for the objects, the priority list including a partition of the objects and corresponding priority levels for classifying the objects, the priority levels including a higher priority level and a lower priority level;
   determining, by the sensor allocator and based on the classification and the priority list for the objects, a second dwell assignment associating each sensor of the sensors with a different object of the objects than that assigned in the first dwell assignment; and
   providing, by the sensor allocator, the second dwell assignment to the one or more devices.

2. The method of claim 1, wherein the first and second dwell assignments minimizes an expected entropy.

3. The method of claim 2, wherein minimizing the expected entropy includes minimizing a sum of expected entropies of all the assignments of the first dwell assignment.

4. The method of claim 3, wherein the expected entropy is determined based on a probability distribution associated with a set of possible classifications for a given object of the objects given a probability distribution associated with a set of sensor measurement that would be measured by the first dwell assignment for the given object.

5. The method of claim 1, further comprising:
   receiving, from a classifier, that classified the objects based on measurements from the sensors in implementing the second dwell assignment, a second classification for each of the objects; and
   determining, by the sensor allocator and based on the second classification, a third dwell assignment associating each sensor of the sensors with a different object of the objects than that assigned in the first dwell assignment and the second dwell assignment.

6. The method of claim 1, wherein the first and second dwell assignments are determined by:
   determining, of possible dwell assignments, which dwell assignments yield a corresponding expected entropy for each of the objects in the higher priority level that is below a first specified threshold entropy resulting in a first subset of dwell assignments;
   determining whether any dwell assignments of the first subset of dwell assignments yield a corresponding expected entropy for each of the objects in the lower priority level that is below a second specified threshold entropy;

responsive to determining that there is no dwell assignment of the first subset of dwell assignments that yields a corresponding expected entropy for each of the objects in the lower priority level that is below the second specified threshold entropy, determining which dwell assignment of the first subset of the dwell assignments yields a lowest expected entropy for the objects in the lower priority level resulting in a determined dwell assignment; and providing the determined dwell assignment to the one or more devices.

7. A non-transitory machine-readable medium including instructions that, when executed by a machine, cause the machine to perform operations for sensor scheduling and object classification, the operations comprising:

determining, by a sensor allocator, a first dwell assignment, the first dwell assignment associating a sensor of sensors with a respective object of objects to be classified;

providing, by the sensor allocator, the first dwell assignment to one or more devices capable of orienting the sensors to measure corresponding assigned objects;

receiving, from a classifier, that classified the objects based on measurements from the sensors in implementing the first dwell assignment, a classification for each of the objects;

receiving, by the sensor allocator, a priority list for the objects, the priority list including a partition of the objects and corresponding priority levels for classifying the objects, the priority levels including a higher priority level and a lower priority level;

determining, by the sensor allocator and based on the classification and the priority list for the objects, a second dwell assignment associating each sensor of the sensors with a different object of the objects than that assigned in the first dwell assignment; and providing, by the sensor allocator, the second dwell assignment to the one or more devices.

8. The non-transitory machine-readable medium of claim 7, wherein the first and second dwell assignments minimizes an expected entropy.

9. The non-transitory machine-readable medium of claim 8, wherein minimizing the expected entropy includes minimizing a sum of expected entropies of all the assignments of the first dwell assignment.

10. The non-transitory machine-readable medium of claim 9, wherein the expected entropy is determined based on a probability distribution associated with a set of possible classifications for a given object of the objects given a probability distribution associated with a set of sensor measurement that would be measured by the first dwell assignment for the given object.

11. The non-transitory machine-readable medium of claim 7, wherein the operations further comprise:

receiving, from a classifier, that classified the objects based on measurements from the sensors in implementing the second dwell assignment, a second classification for each of the objects; and determining, by the sensor allocator and based on the second classification, a third dwell assignment associating each sensor of the sensors with a different object of the objects than that assigned in the first dwell assignment and the second dwell assignment.

12. The non-transitory machine-readable medium of claim 7, wherein the first and second dwell assignments are determined by:

determining, of possible dwell assignments, which dwell assignments yield a corresponding expected entropy for each of the objects in the higher priority level that is below a first specified threshold entropy resulting in a first subset of dwell assignments;

determining whether any dwell assignments of the first subset of dwell assignments yield a corresponding expected entropy for each of the objects in the lower priority level that is below a second specified threshold entropy;

responsive to determining that there is no dwell assignment of the first subset of dwell assignments that yields a corresponding expected entropy for each of the objects in the lower priority level that is below the second specified threshold entropy, determining which dwell assignment of the first subset of the dwell assignments yields a lowest expected entropy for the objects in the lower priority level resulting in a determined dwell assignment; and providing the determined dwell assignment to the one or more devices.

13. A system comprising:

sensors;

a sensor allocator configured to:

receive a priority list for objects, the priority list including a partition of the objects and corresponding priority levels for classifying the objects, the priority levels including a higher priority level and a lower priority level;

determine, based on the priority list, a first dwell assignment, the first dwell assignment associating a sensor of the sensors with a respective object of the objects to be classified; and provide the first dwell assignment to one or more devices capable of orienting the sensors to measure corresponding assigned objects;

a classifier configured to provide classification for each of the objects based on measurements from the sensors in implementing the first dwell assignment;

the sensor allocator further configured to:

determine, by the sensor allocator and based on the classification, a second dwell assignment associating each sensor of the sensors with a different object of the objects than that assigned in the first dwell assignment; and provide, by the sensor allocator, the second dwell assignment to the one or more devices.

14. The system of claim 13, wherein the first and second dwell assignments minimizes an expected entropy.

15. The system of claim 14, wherein minimizing the expected entropy includes minimizing a sum of expected entropies of all the assignments of the first dwell assignment.

16. The system of claim 15, wherein the expected entropy is determined based on a probability distribution associated with a set of possible classifications for a given object of the objects given a probability distribution associated with a set of sensor measurement that would be measured by the first dwell assignment for the given object.

17. The system of claim 13, wherein the sensor allocator is further configured to:

receive, from the classifier, that classified the objects based on measurements from the sensors in implementing the second dwell assignment, a second classification for each of the objects; and determining, based on the second classification, a third dwell assignment associating each sensor of the sensors with a different object of the objects than that assigned in the first dwell assignment and the second dwell assignment.

18. The system of claim 13, wherein the sensor allocator is further configured to:

determine, of possible dwell assignments, which dwell assignments yield a corresponding expected entropy for each of the objects in the higher priority level that is below a first specified threshold entropy resulting in a first subset of dwell assignments;

determine whether any dwell assignments of the first subset of dwell assignments yield a corresponding expected entropy for each of the objects in the lower priority level that is below a second specified threshold entropy;

responsive to determining that there is no dwell assignment of the first subset of dwell assignments that yields a corresponding expected entropy for each of the objects in the lower priority level that is below the second specified threshold entropy, determine which dwell assignment of the first subset of the dwell assignments yields a lowest expected entropy for the objects in the lower priority level resulting in a determined dwell assignment; and provide the determined dwell assignment to the one or more devices.

* * * * *